(12) United States Patent
Petrov et al.

(10) Patent No.: US 12,510,717 B2
(45) Date of Patent: Dec. 30, 2025

(54) DUAL-DIAMETER JACKETED FIBER-COUPLED OPTOELECTRONIC MODULE

(71) Applicant: Metrohm Spectro, Inc., Plainsboro, NJ (US)

(72) Inventors: Dmitriy Petrov, East Windsor, NJ (US); Faraz Hashmi, East Windsor, NJ (US); Greg W. Charache, East Windsor, NJ (US)

(73) Assignee: Metrohm Spectro, Inc., Plainsboro, NJ (US)

( * ) Notice: Subject to any disclaimer, the term of this patent is extended or adjusted under 35 U.S.C. 154(b) by 302 days.

(21) Appl. No.: 18/141,929

(22) Filed: May 1, 2023

(65) Prior Publication Data

US 2024/0319465 A1     Sep. 26, 2024

Related U.S. Application Data (60) Provisional application No. 63/454,252, filed on Mar. 23, 2023.

(51) Int. Cl.
    *G02B 6/44*      (2006.01)

(52) U.S. Cl.
    CPC .......... *G02B 6/443* (2013.01); *G02B 6/4486* (2013.01)

(58) Field of Classification Search
    CPC ..... G02B 6/4292; G02B 6/4296; G02B 6/443
    See application file for complete search history.

(56) References Cited

U.S. PATENT DOCUMENTS

| | | | | |
|---|---|---|---|---|
| 4,217,030 A | * | 8/1980 | Howarth .............. | G02B 6/3883 385/59 |
| 4,330,172 A | * | 5/1982 | Monaghan ........... | G02B 6/3831 385/59 |
| 5,081,695 A | * | 1/1992 | Gould .................. | G02B 6/4439 385/99 |

FOREIGN PATENT DOCUMENTS

| | | | | |
|---|---|---|---|---|
| CN | 105913946 A | * | 8/2016 | ............. H01B 11/22 |
| JP | H11233230 A | * | 8/1999 | |

\* cited by examiner

*Primary Examiner* — Charlie Y Peng
(74) *Attorney, Agent, or Firm* — Law Office of Carl Giordano, PC (57) ABSTRACT

A dual-diameter armor jacketing assembly method for protecting the fiber optic cable of an optoelectronic module is demonstrated. This method allows for rigid attachment of the armor jacketing to both the optoelectronic module housing and the fiber connector and also for rotation of the fiber connector for polarization maintaining fiber assemblies.

10 Claims, 7 Drawing Sheets

DUAL-DIAMETER JACKETED FIBER-COUPLED OPTOELECTRONIC MODULE

CLAIM OF PRIORITY

This applicant claims, pursuant to 35 U.S.C. 119, priority to, and the benefit of the earlier filing date of U.S. Provisional Patent Application Ser. No. 63/454,252 filed on Mar. 23, 2023, the contents of which is incorporated by reference, herein.

FIELD OF THE INVENTION

This invention relates to the field of electro-optical module packaging and more particularly to a jacketed fiber-coupled optoelectronic modules.

BACKGROUND OF THE INVENTION

Fiber coupled optoelectronic modules are well-known in the art and have been utilized for various industrial, scientific, and engineering applications. These modules, typically, include a metal housing for electrical connection, a semiconductor laser diode light source, optics for collimation of a rapidly diverging output beam of the semiconductor light source, a thermoelectric cooler for maintaining temperature control, a photodiode for monitoring the laser diode output power, a thermistor for monitoring the laser diode temperature, a platform for mounting the various components and a means to focus the light into an optical fiber that is attached through an adaptor that maintains a proper relationship between the fiber and the output laser light.

At the output of the optical fiber is an optical connector that provides a means for connecting the optical fiber to subsequent elements in the optical system.

However, optical fibers are generally the size of human hairs and are often prone to physical damage due to the fragile nature of the glass fiber. For example, too tight a bend of an optical fiber bundle, comprising a plurality of optical fibers, may cause one or more of the optical fibers to be damaged.

Hence, there is a need in the industry for a reliable and compact method to protect the optical fiber from breakage between the housing of the optoelectronic module and the optical connector.

SUMMARY OF THE INVENTION

A fiber optical bundle jacket is disclosed that protects the optical bundle from damage is disclosed.

Disclosed is a dual jacketed optical fiber bundle that prevents kinking or flexing of a contained optical fiber by preventing the optical fiber from being bent in a radius that is smaller than a recommended minimum bending radius Disclosed is a method for forming a dual jacketed protection sleeve for the prevention of damage to an enclosed optical fiber bundle comprising at least one optical fiber.

Disclosed is a method for forming a dual jacketed protection sleeve for the prevention of damage to an enclosed optical fiber bundle comprising at least one of a fiber.

Disclosed is a jacketed protection sleeve for the protection of optical fibers that be of a multi-mode type, a single mode type, a polarization maintaining type, a photonic crystal type, etc.

In one aspect of the invention, a dual-diameter armor jacketing is utilized to accommodate a rigid attachment of the armor jacket to both ends of the fiber optic cable and also allow for the rotation of the fiber connector, relative to the optical fiber, for alignment of polarization maintaining fiber when necessary.

BRIEF DESCRIPTION OF DRAWINGS

For a better understanding of exemplary embodiments and to show how the same may be carried into effect, reference is made to the accompanying drawings. It is stressed that the particulars shown are by way of example only and for purposes of illustrative discussion of the preferred embodiments of the present disclosure and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION

Figure 1:
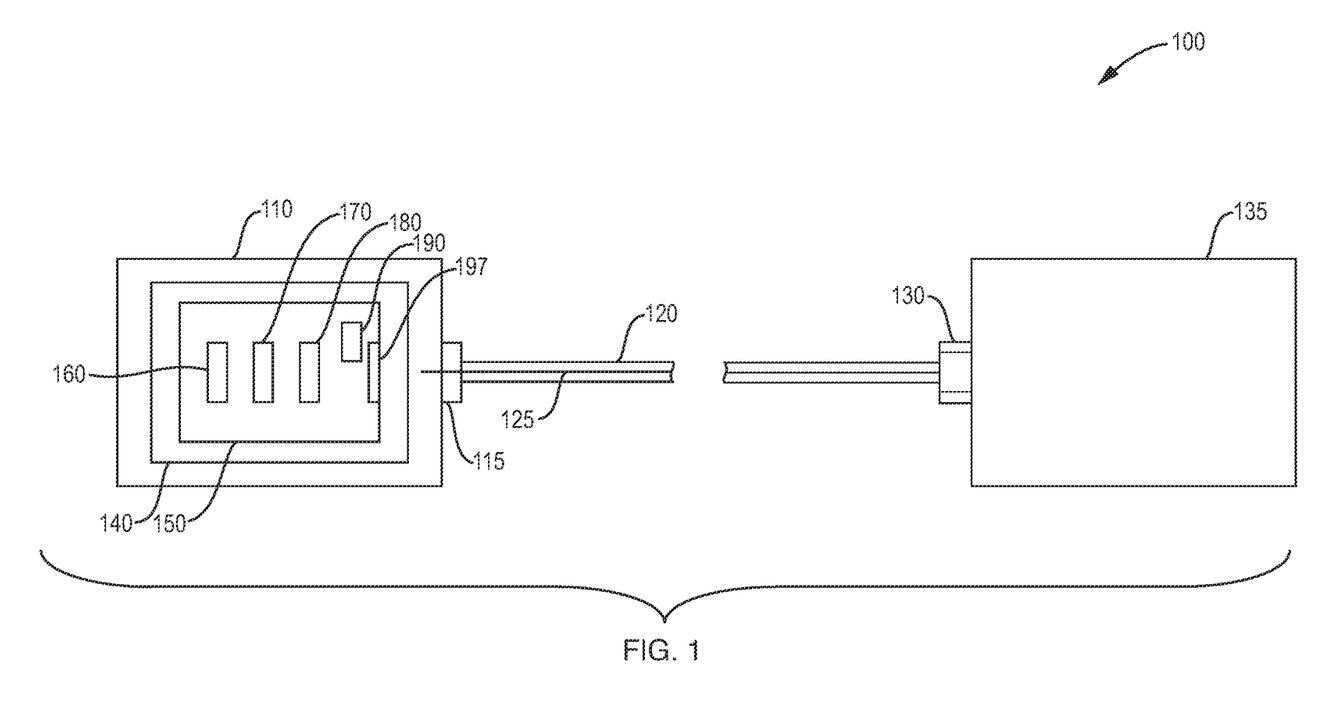
FIG. 1 illustrates a block diagram of a conventional fiber optical coupled optoelectronic module.

FIG. 1 illustrates a block diagram of a conventional fiber optical-coupled laser diode package or module.

In this illustrative example, optical-coupled laser diode package or module. 100 comprises laser diode module 110, a fiber bundle 120 comprising at least one fiber cable 125, and an optical fiber connector 130, at a distal end of the fiber bundle 120, suitable for connecting fiber bundle 120 to other optical elements 135.

Fiber cable 125 comprises a glass optical fiber encased in a cladding that retains the light within cable 125 such that no lights escapes from cable 125 along the length of cable 125. A plurality of fiber cables 125 are generally included within a fiber bundle 120 to provide for parallel transmission of light.

Laser diode module 110 comprises one or more known electro-optic components, such as a thermo-electric cooler 140 for providing temperature control of laser diode module 100 and optical platform 150 on which components, such as a semiconductor laser diode 160 may be mounted. In addition, one or more components, such as light collimator 170, thermistor 180, and photodiode 190, for power measurement, may be utilized to improve the performance of the laser diode module 100.

Further illustrated is optical element 197, which provides for the focusing of light emitted by laser diode 160 into optic fiber bundle 120 (or fiber cable 125). In one aspect, optical element 197 may be a shaped lens that focuses the light directly on an end(s) of the one or more fiber cable(s) 125 within bundle 120.

Fiber cable 125 enters module 110 through a stub or stout 115 positioned on laser module 115. Stub or stout 115 retains fiber 125 is a position that allows for maximum light input.

Optical fiber bundle 120, comprising at least one optical fiber 125, exiting the module 110, is not limited to a single type of optical fiber 125 and may include one or more different fiber designs. For example, optical fiber 125 may comprise a step-index or gradient index multimode fiber, step index or gradient index single mode fiber, a polarization maintaining fiber, and/or a photonic crystal fiber. In addition, various methods of attachment of the fiber optic cable 125 to the platform 150 within the laser diode module 110 may be utilized. For example, soldering, welding, and epoxy are typical methods for retain fiber 125 in place.

In addition, it would be understood by those skilled in the art that the end(s) of the at least one fiber cable(s) 125 receiving the laser light emitted by the diode module 160 may be comprise a shaped lens, a flat cleaved surface, an angle cleaved surface, an angle polished surface and an anti-reflection coating, etc.

Optical-coupled laser diode modules 100, are generally composed of a fixed fiber length that are sized based on the distance requirements between the module 110 and the connected other optical element 135. For example, packages 100 may be ordered with a half-meter (0.5) length of fiber, a one (1) meter length of fiber, a two (2) meter length of fiber, etc. Generally, excessive fiber is rolled or coiled to take up any excessive fiber length. Rolling or coiling the excessive fiber length into too tight a circle may lead to damage to the fiber cable.

It is understood that FIG. 1 illustrates an exemplary embodiment of a laser diode module 110 and is just one example of the types of electro-optic components that could be mounted within the optoelectronic module 100. Thus, it is not necessary to include all the components listed. For example, the thermoelectric cooler 140 may be omitted for designs that do not include active cooling. Alternatively, other elements may be utilized. For example, volume Bragg gratings, optical isolators, filters, optical detector arrays, etc., may be utilized without altering the scope of the invention claimed.

Further illustrated is optical connector 130 positioned on a distal end of optical bundle 120. Optical connector 130 may comprise a SubMinature version A (SMA) connector, a Fiber Cable/Physical Contact (FC/PC) connector, or a Fiber Cable/Angled Physical Contact (FC/APC) connector suitable for connection to different optical devices 135.

Figure 2:
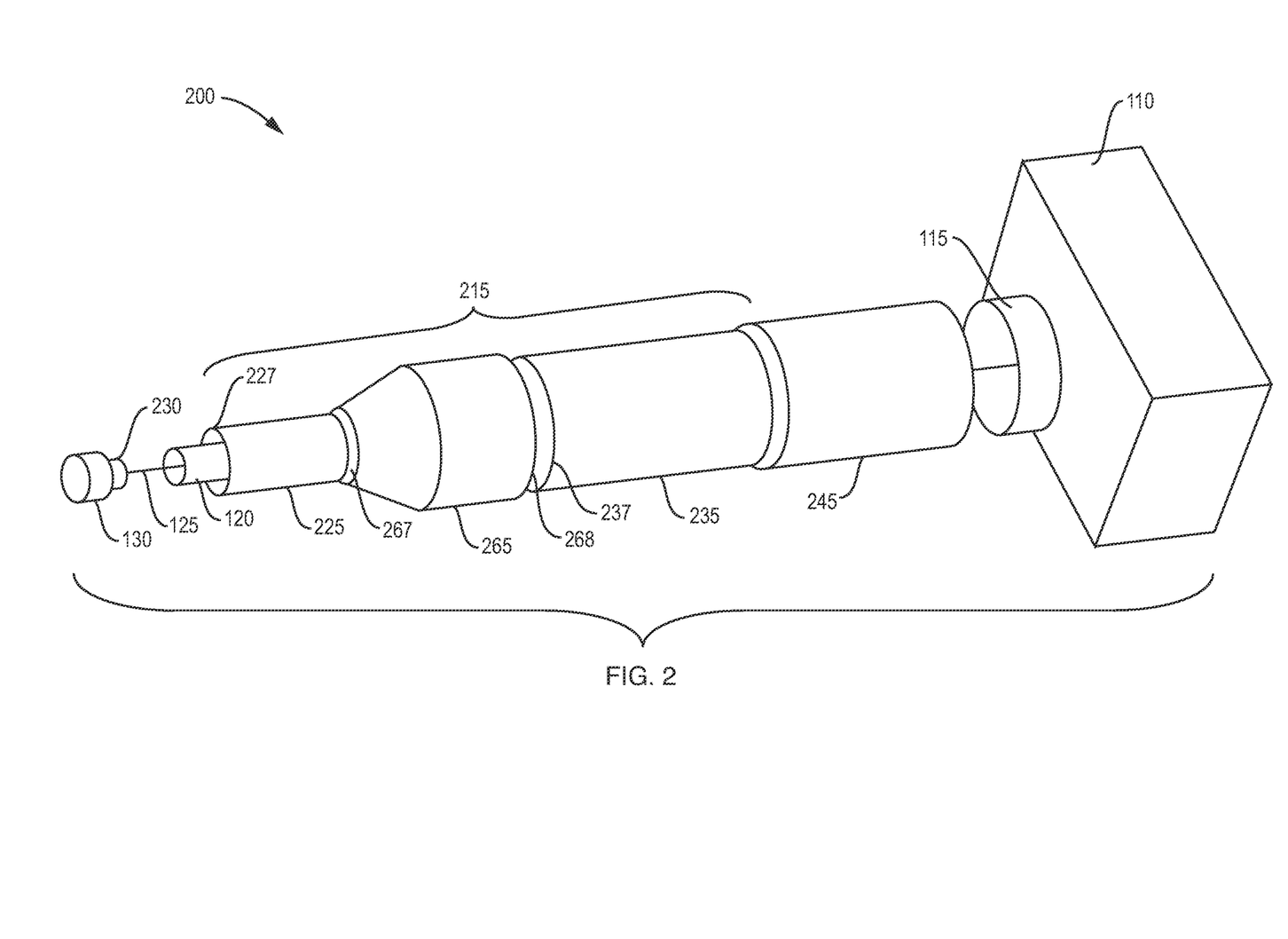
FIG. 2 illustrates an exploded perspective view of an exemplary embodiment of a jacketed fiber-coupled optoelectronic module in accordance with the principles of the invention.

FIG. 2 illustrates an exploded prospective view of an exemplary embodiment of a jacketed fiber optical coupled optoelectronic system 200 in accordance with the principles of the invention.

In this illustrative exemplary embodiment fiber optical cable jacket 215, containing fiber cable 120, therein, is shown extending from laser diode module 110 to connector 130. In accordance with the principles of the invention, fiber optical cable jacket 215 comprises an inner jacket element 225, an outer jacket element 235 and a reducer or reduction adaptor 265, which provides a transition between outer jacket 235 and inner jacket 225. As shown, inner jacket 225 extends from a distal end of fiber cable 125 toward laser module 110, wherein the distal end 227 of inner jacket 225 abuts, slides over or slides into connector 130. In this exemplary embodiment, connector 130 comprises a nipple 230 into which fiber 125 may be inserted and inner jacket 225 may slide over. In one aspect of the invention, inner jacket 225 may be attached to connector 130 by one of an adhesive, welding, soldering or a crimping. Inner jacket 225 provides reinforcement and protection to the connection between fiber cable 125 and connector 130.

In accordance with the principles of the invention, the inner jacket element 225 is at least one of slidable and rotatable with respect to adaptor 265 and outer jacket 235.

Further illustrated is outer jacket 235 positioned substantially adjacent laser module 110 and extending a known distance from laser module 110. Outer jacket 235 may be abutted to, inserted into or slid over stout 115. Fiber 125, within jacket 215 enters laser module 110, through snout 115, as previously described.

In accordance with one aspect of the invention, a proximal sleeve 245 is further included. Proximal sleeve 245 is positioned over proximal end of outer jacket 235 and sized to slid over snout 115. Proximal sleeve 245 retains outer jacket 235 adjacent to laser module 110 and provides addition support for the protection of the connection of fiber 125 to module 110. Proximal sleeve 245 may be retained in place with respect to module 110 by the use of an adhesive, for example, or other similar connection methods. Similarly outer jacket 235 may be held in place with respect to proximal sleeve 245 (and to snout 115) by use of an adhesive, for example.

Reduction adaptor 265 positioned between inner jacket 225 and outer jacket 235 includes a center opening, on its distal end 267, which is sized to allow entry of inner jacket 225, therein, and sized on its proximal end to be slidable over a distal end 237 of outer jacket 235. Adaptor 265 provides a connection between inner jacket 225 and outer jacket 235, wherein inner jacket 225 is, prior to permanent attachment, slidable and rotatable with respect of adaptor 265 and the outer jacket 235. Inner jacket 225 and outer jacket 235 may be retained in place with respect of adaptor 265 using an adhesive, for example.

Figure 3:
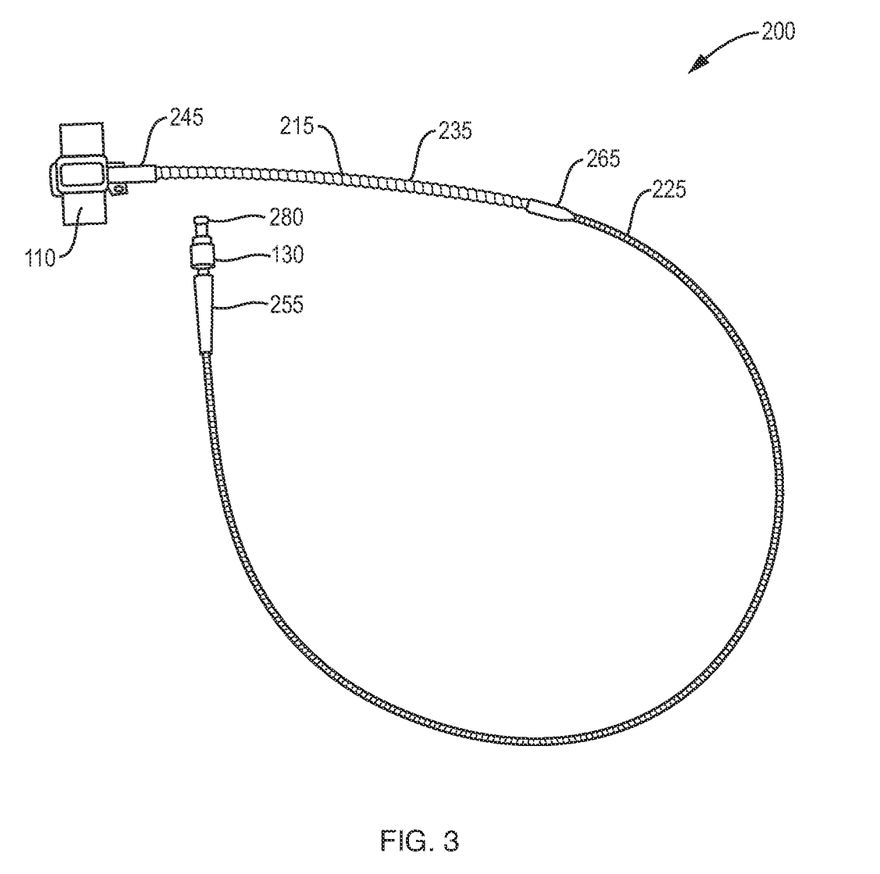
FIG. 3 illustrates an exemplary embodiment of an assembled jacketed fiber-coupled optoelectronic module in accordance with the principles of the invention.

FIG. 3 illustrates an exemplary embodiment of an assembled jacketed fiber-coupled optoelectronic module 200 comprises laser module 110, dual-jacketed protection cable 215 comprising outer jacket 235, inner jacket 225 and reduction adaptor 265 retaining outer jacket 235 and inner jacket 225 in place, and a connector 130 suitable for connecting to another optical component 135.

Further illustrated is distal sleeve 255. Distal sleeve 255, similar to proximal sleeve 245, provides additional support and protection of the connection, in this case, between distal end 227 of inner jacket 225 and connector 130 or nipple 230. End cap 280 provides a removable covering of exposed end(s) of fiber cable 125 within fiber bundle 120. Removal of end cap 280 enables the exposed distal end(s) of fiber cable 125 to optically connect to another optical system 135.

As shown, jacket 215 provides additional support that limits an amount of bend of fiber 125 that may be introduced when connecting module 200 to another optical component (not shown). Accordingly, jacket 215 is advantageous as it prevents damage to fiber 125 through the limitation in the bending of fiber cable 125.

Figure 4:
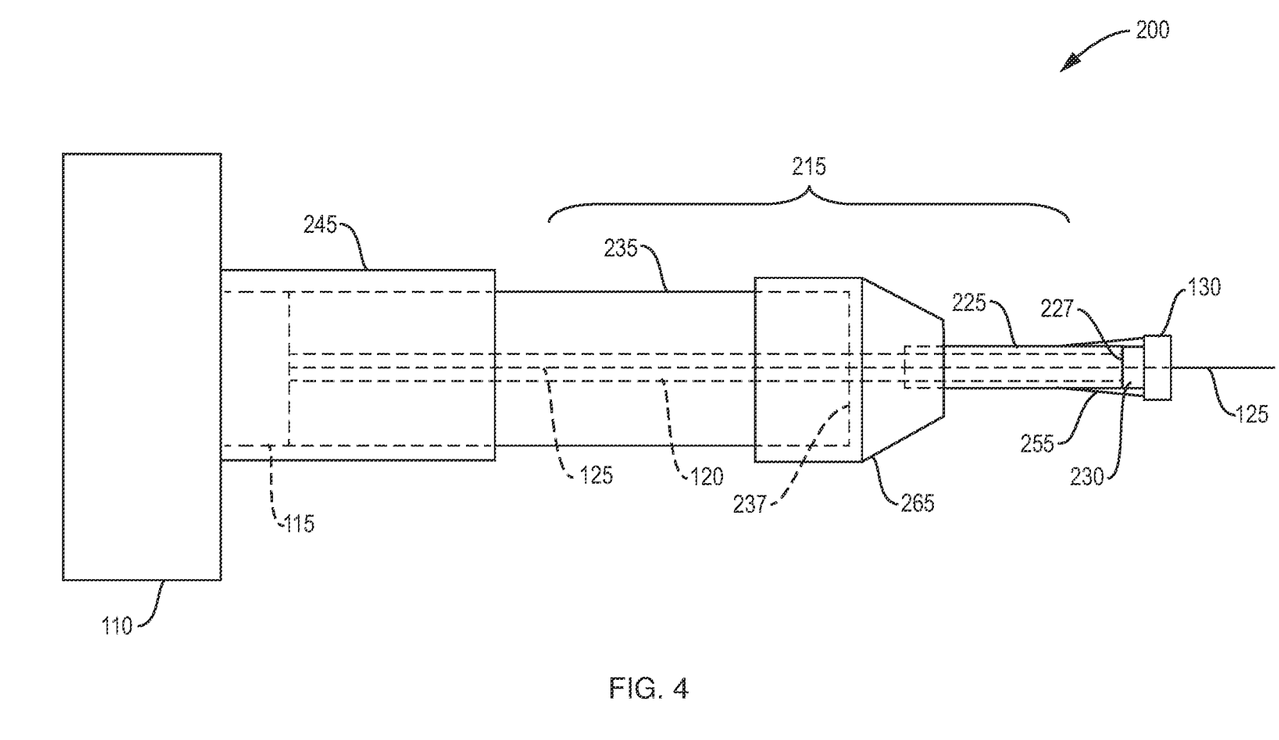
FIG. 4 illustrates a cut-away side view of the exemplary embodiment of dual-diameter armor jacketed fiber optical-coupled optoelectronic module in accordance with the principles of the invention.

FIG. 4 illustrates a cut-away side view of the exemplary embodiment of a dual-jacket laser module 200 comprising laser diode module 110, optical bundle 120 comprising at least one optical fiber 125 and cap 130, as previously discussed.

Further illustrated is inner jacket 225, extending from cap 130 toward adaptor 265 and outer jacket 235 extending from laser module 110, wherein adaptor 265, positioned on a distal end 237 of outer jacket 235, provides for a transition between a dimension of outer jacket 235 and a dimension of inner jacket 225.

As previously discussed, outer jacket 235 may be retained adjacent to (abut, over or within) snout 115 by soldering or epoxy-ing, (i.e., an adhesive) for example. Alternatively, jacket 235 and fiber bundle 120 may be held within snout 115 by a screw thread/compression cap, where snout 115 comprises a matching screw thread. In this illustrated example, outer jacket is shown abutting.

In accordance with the principles of the invention, step-down adaptor (reducer sleeve) 265, positionable over distal end 237 of outer jacket may be held in place by an adhesive (e.g., epoxy) and allows for the slidability, laterally and/or rotatably, of inner jacket 225 contained, therein. In addition, the inner jacket 225 may slide within the outer jacket 235.

Further illustrated is sleeve 245 positioned over snout 115 and proximal end of outer jacket 235. Sleeve 245 provides additional reinforcement of the connection of the one or more fiber cable(s) 125 within bundle 120 to snout 115.

In accordance with the principles of the invention, jacket 215 enclosing optical fiber 125 comprises a material that limits the bending of fiber 125 over the length of the fiber bundle 125 and further provides for securing the connection to module 110. In accordance with one aspect of the invention, one or both of inner jacket 225 and outer jacket 235 may be composed of a metallic (i.e., amour) material. Alternatively, one or both of inner jacket 225 and outer jacket 235 may be composed of a semi-rigid material (i.e., industrial plastic).

In still another aspect of the invention, one or both of inner jacket 225 and outer jacket 235 may be composed of a pliable material that allows for a limited amount of bending of fiber 125 contained within jacket 215.

Figure 5:
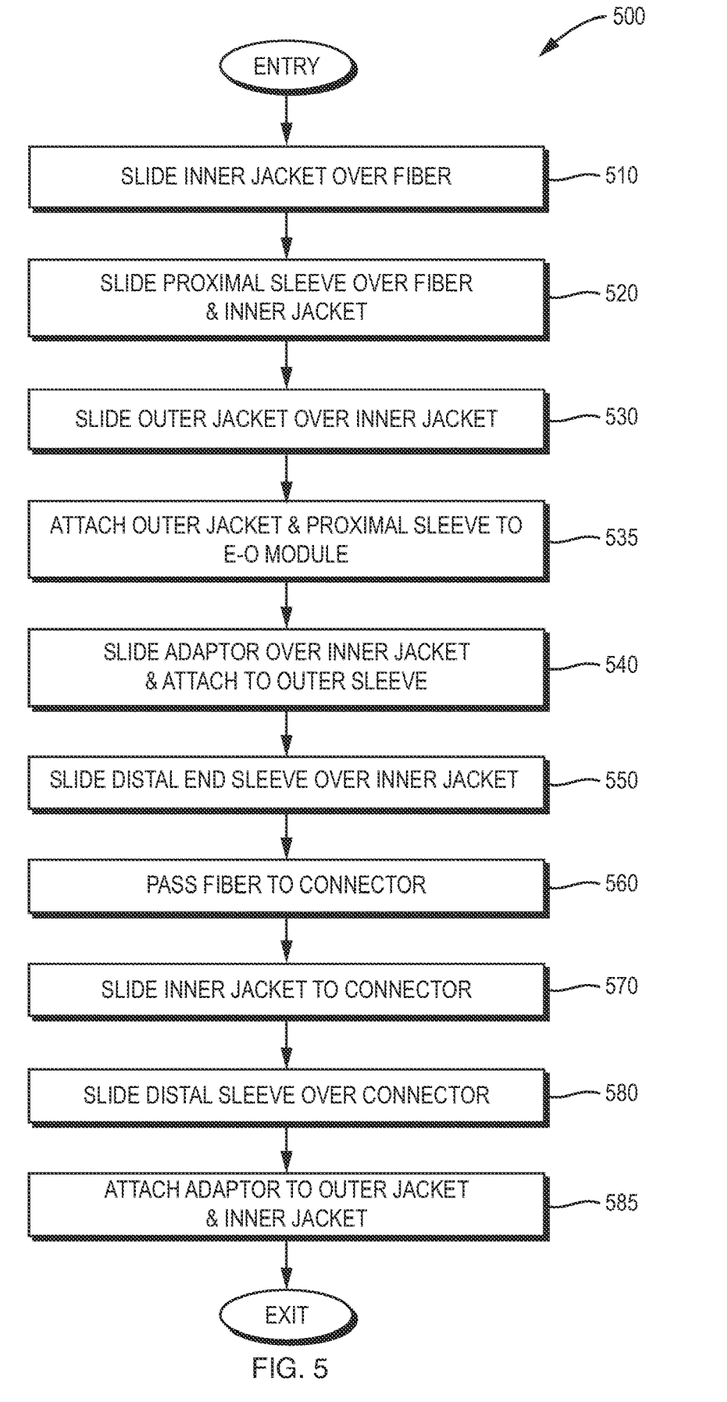
FIG. 5 illustrates a flow chart of a first exemplary process for forming a jacketed optical cable in accordance with the principles of the invention.

FIG. 5 illustrates a flow chart of a first exemplary process for forming a jacketed optical cables in accordance with the principles of the invention.

In this illustrative process, fiber 125 of laser diode systems 200 are of a fixed length, and as such an inner jacket is slid over the fiber cable at step 510, wherein a length of the inner jacket 225 is less than a length of the fiber cable 125. The shorter length of inner jacket 225 enables distal end section of fiber cable 125 to remain exposed. At step 520, proximal sleeve 245 is slid over inner jacket 225. At step 530, outer jacket 235 is slide over inner jacket 225 and positioned adjacent to electro-optical module 110. Outer jacket 235 may further be attached to module 110 at this time. At step 535, proximal sleeve 245 and outer jacket 235 are attached to electro-optical module 110. In addition, outer sleeve 235 may be attached to proximal sleeve 245. In one aspect of the invention, a length of outer sleeve 235 is determined to extend from the electro-optical module 110 to a proximal end of inner cable 225, wherein the combined length of inner jacket 225 and outer jacket 235 is greater than fiber cable 125. At step 540, adaptor 265 is slide over inner jacket 225 and placed on distal end 237 of outer jacket 235.

At step 550, distal end protective sleeve 255 may be slid over inner jacket 225. Distal end protective sleeve 255 provides additional support to, and protection of, a connection between inner jacket 235 and connector 130.

At step 560, a distal end of fiber cable 125 is passed through connector 130, as previously discussed. In accordance with one aspect of the invention, the fiber may be rotated to provide for maintaining correct polarization of the light with respect to connector 130. In step 570, inner jacket 225 is slid over the exposed section of the distal end of fiber cable 125 to be rendered adjacent to connector 130. The protective sleeve 255, if included, may then be slid over inner jacket 225 and connector 130, at step 580, to provide protection to the connection between fiber cable 125 and connector 130.

At step 585, adapter 265 is attached to the distal end of outer jacket 235 and along an outer surface of inner jacket 225 to retain inner jacket 225 and outer jacket 235 permanently attached.

Figure 6A:
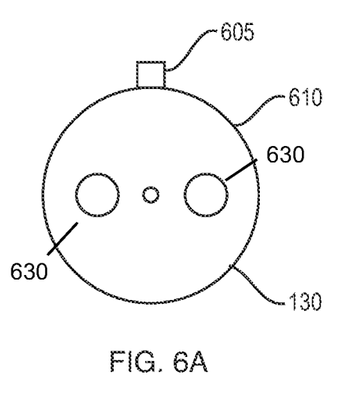
FIGS. 6A and 6B illustrate exemplary embodiments of an optical connector for maintaining polarization alignment.
Figure 6B:
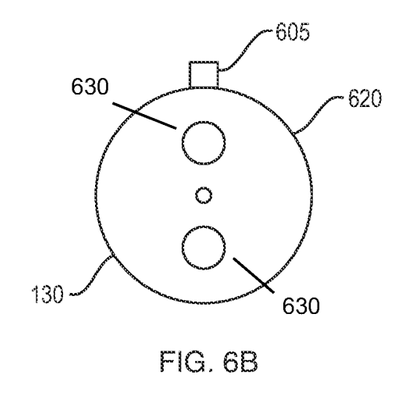

FIGS. 6A and 6B illustrate exemplary embodiments of an optical connector for maintaining polarization alignment of the fiber stress rods 630 relative to the connector alignment key 605. Alignment key 605 provides for a correct orientation of the connector with regard to a matting connector 130.

In one aspect of the invention, optical module 200 may comprise polarization maintaining fiber 125 that maintains the polarization of the light transmitted though fiber 125. In this case, connector 130 requires a specific orientation of fiber 125 with respect to connector 130 to maintain the polarization of the light passing through fiber 125.

FIG. 6A illustrates an exemplary embodiment of a "fast axis coupled" fiber 610, wherein fiber 125 (not shown) is positioned or oriented with respect of connector 130 to maintain the proper orientation of the light transmitted through fiber 125. FIG. 6B illustrates an exemplary embodiment of a "slow axis coupled" fiber 620.

In accordance with the principles of the invention, during the fabrication of laser module 200 as shown in FIG. 5, the exposed distal end of fiber 125 may be rotated with respect to the fiber connector 130 to provide for the correct orientation of fiber 125 to maintain a correct polarization of the light transmitted through fiber 125.

Figure 7:
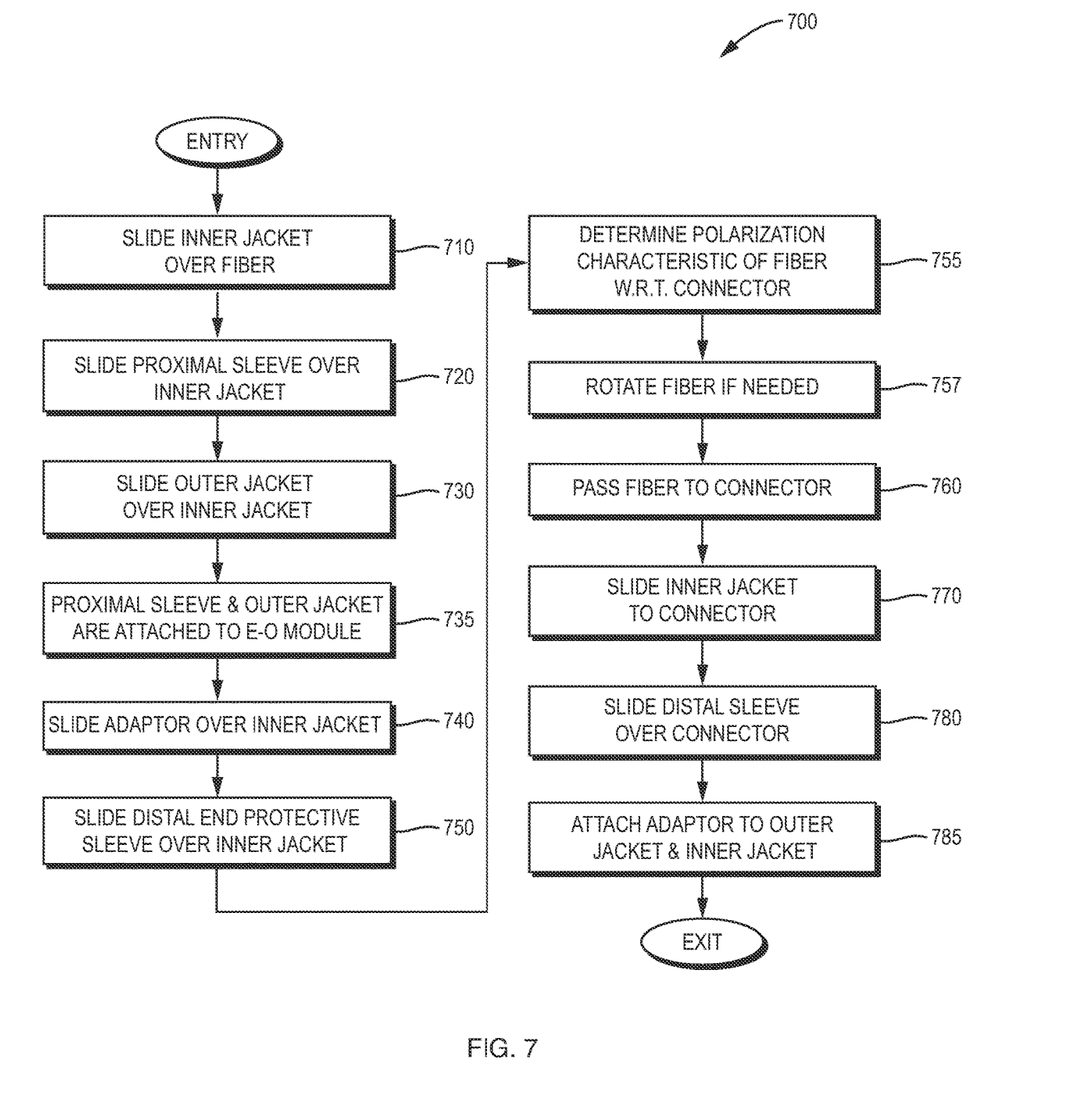
FIG. 7 illustrates a flow chart of a second exemplary process for forming a jacketed optical cable in accordance with the principles of the invention.

FIG. 7 illustrates a flow chart of a second exemplary process for forming a jacketed polarization aligned optical cable in accordance with the principles of the invention.

In this illustrative process, which is similar to the process discussed and shown with regard to FIG. 5, at step 710, inner jacket 235 is slid over the fiber cable 125, wherein a length of the inner jacket is less than a length of the fiber cable 125. At step 720, proximal sleeve 265 is slid over inner jacket 225 and at step 730, outer sleeve 235 is slide over inner jacket 225 and positioned adjacent, and attached, to electro-optical module 110. At step 735 proximal sleeve 265 and outer jacket 235 are attached to electro-optical module 110 and outer sleeve 235. At step 740, adaptor 265 is slide over inner jacket 225 and placed on the distal end of outer jacket 235. At step 750, a protective sleeve 255 may be slid over inner jacket 225. At step 755, a determination may be made with regard to the polarization nature of fiber cable 125 and, at step 757, if necessary, fiber cable 125 may be rotated with respect to the connector 130 to allow for axial alignment of the fiber 120 relative to the connector 130 before attachment of the fiber connector 130 to the fiber 120 with adhesive (see FIGS. 6A and 6B). Accordingly, fiber 125 is oriented to maintain proper polarization of the light transmitted through fiber 125.

At step 760, fiber 125 is passed to connector 130 and at step 570, inner jacket 225 is slid over the exposed section of the distal end of fiber cable 125 to be adjacent to connector 130, wherein inner jacket 225 is attached to connector 130. At step 780, protective sleeve 255, if included, may then be slid over inner jacket 225 and connector 130, to provide protection to the connection between fiber cable 125 and connector 130.

At step 785, adapter 265 is attached to the distal end of outer jacket 235 and along an outer surface of inner jacket 225 to retain inner jacket 225 and outer jacket 235 permanently attached.

Although FIGS. 5 and 7 illustrate method steps for forming a dual-diameter jacketed fiber-cable, it would be understood and, within the knowledge of those skilled in the art, to modify the order of the illustrated method steps and such modification have been contemplated and are within the scope of the invention claimed.

In summary, a dual-jacket fiber cable configuration is disclosed that includes an inner jacket and an outer jacket, wherein an adaptor provides for the slidable arrangement of the inner jacket with respect to the outer jacket. The dual-jacket fiber cable disclose prevents damage to a fiber cable by kinking or bending.

Although the invention disclosed herein discusses a specific configuration, it would be recognized that the dual jacket fiber cable configuration may utilize different materials that prevent damage to an enclosed cable.

Although a laser diode (i.e., light emitting) system is discussed with regard to an opto-electronic module, it would be understood that the principles of the invention disclosed would be applicable to other types of opto-electronic modules (e.g., detector based (i.e., light collection) systems, without altering the scope of the invention claimed.

Although the invention has been described with regard to a fiber connection to convey light between the illustrated elements associated with the illustrated embodiments, it would be recognized that the optical connection between the illustrated elements may be one of a free space optical connection.

The invention has been described with reference to specific embodiments. One of ordinary skill in the art, however, appreciates that various modifications and changes can be made without departing from the scope of the invention as set forth in the claims. Accordingly, the specification is to be regarded in an illustrative manner, rather than with a restrictive view, and all such modifications are intended to be included within the scope of the invention.

Benefits, other advantages, and solutions to problems have been described above with regard to specific embodiments. The benefits, advantages, and solutions to problems, and any element(s) that may cause any benefits, advantages, or solutions to occur or become more pronounced, are not to be construed as a critical, required, or an essential feature or element of any or all of the claims.

What is claimed is:

1. An opto-electronic fiber optical cable system comprising:
    an opto-electronic module configured to:
        emit light or detect light;
    a fiber cable enclosed within a jacket, said jacket comprising:
        an inner jacket extending a known length of said fiber optical cable from a distal end of said fiber cable;
        an outer jacket extending from said opto-electronic module, wherein a length of said inner jacket and said outer jacket is substantially equal to a length of said fiber cable; and
        reduction adaptor positioned over a distal end of said outer jacket and attached to an outer surface of said inner jacket, wherein the inner jacket is slidable and rotatable with respect to the reduction adaptor and is further allowed to slide within the outer jacket.

2. The opto-electronic system of claim 1, wherein said inner jacket is selected from a group consisting of: an armored cable, an industrial plastic and a pliable material.

3. The opto-electronic system of claim 1, wherein said outer jacket is selected from a group consisting of: an armored cable, an industrial plastic and a pliable material.

4. The opto-electronic system of claim 1, wherein said inner jacket and said outer jacket are attached to said adaptor by at least one of: an adhesive, welding, and soldering.

5. The opto-electronic system of claim 1, comprising:
    a connector positioned at a distal end of the fiber optic cable, the connector being one of: an SMA connector, a FC/PC connector, and a FC/AFC connector.

6. The opto-electronic system of claim 1, wherein said module comprises a snout, the snout comprising:
    an entry port into which said fiber cable is placed.

7. The opto-electronic system of claim 6, wherein a connection between said module and said outer jacket is one of: the outer jacket abutting said snout, the outer jacket slid over said snout, and the outer jacket slid into said snout.

8. The opto-electronic system of claim 1, a connection between said inner jacket and said connector is one of: abutting the inner jacket with said connector, sliding the inner jacket over said connector, and sliding the inner jacket into said connector.

9. The opto-electronic system of claim 1, comprising:
    a proximal sleeve positioned over said snout and said outer jacket.

10. The opto-electronic system of claim 5, comprising:
    a distal sleeve positioned over said inner jacket and said connector.

* * * * *